(12) United States Patent
Dorsey et al.

(10) Patent No.: US 10,942,850 B2
(45) Date of Patent: Mar. 9, 2021

(54) PERFORMANCE TELEMETRY AIDED PROCESSING SCHEME

(71) Applicant: Apple Inc., Cupertino, CA (US)

(72) Inventors: John G. Dorsey, San Francisco, CA (US); Aditya Venkataraman, Sunnyvale, CA (US); Bryan R. Hinch, Campbell, CA (US); Daniel A. Chimene, San Francisco, CA (US); Andrei Dorofeev, San Jose, CA (US); Constantin Pistol, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/513,225

(22) Filed: Jul. 16, 2019

(65) Prior Publication Data

US 2021/0019258 A1    Jan. 21, 2021

(51) Int. Cl.
    *G06F 12/00*      (2006.01)
    *G06F 12/0802*      (2016.01)

(52) U.S. Cl.
    CPC ...... *G06F 12/0802* (2013.01); *G06F 2212/60* (2013.01)

(58) Field of Classification Search
    CPC .................... G06F 12/0802; G06F 2212/60
    See application file for complete search history.

(56) References Cited

U.S. PATENT DOCUMENTS

| 9,940,246 | B1 * | 4/2018 | Drerup | ............... G06F 12/0864 |
| 2011/0185203 | A1 * | 7/2011 | Carlson | ............... G06F 11/3058 |
| | | | | 713/320 |

* cited by examiner

*Primary Examiner* — Shawn X Gu
(74) *Attorney, Agent, or Firm* — Blank Rome LLP (57) ABSTRACT

A processing system can include a plurality of processing clusters. Each processing cluster can include a plurality of processor cores and a last level cache. Each processor core can include one or more dedicated caches and a plurality of counters. The plurality of counters may be configured to count different types of cache fills. The plurality of counters may be configured to count different types of cache fills, including at least one counter configured to count total cache fills and at least one counter configured to count off-cluster cache fills. Off-cluster cache fills can include at least one of cross-cluster cache fills and cache fills from system memory. The processing system can further include one or more controllers configured to control performance of one or more of the clusters, the processor cores, the fabric, and the memory responsive to cache fill metrics derived from the plurality of counters.

40 Claims, 8 Drawing Sheets

PERFORMANCE TELEMETRY AIDED PROCESSING SCHEME

BACKGROUND

For a long time computer processors have used caching of data and instructions to be executed by the processors to increase performance. In many modern computing systems, there may be multiple levels of caches, with smaller and faster caches located nearer the processing unit and larger but slower caches located farther away. Many computing systems, ranging from portable devices like smartphones and tablets, through personal computers like notebook and desktop computers, to servers and computing clusters, rely on multi-core processing devices. These multi-core processing devices may even include clusters of cores. Depending on how various computing workloads are assigned to these multiple cores and multiple clusters, traditional caching techniques may not provide the desired level of performance. However, to date, multi-core, multi-cluster computing systems have not provided suitable infrastructure to adapt caching techniques to a multi-core, multi-cluster system, particularly systems in which different cores and clusters have different performance capabilities. Thus, what is needed in the art are improved techniques for managing performance of such multi-core, multi-cluster processing systems responsive to suitable caching techniques.

SUMMARY

A processing system can include a plurality of processing clusters. Each processing cluster can include a plurality of processor cores and a last level cache. Each processor core can include one or more dedicated caches and a plurality of counters. The plurality of counters may be configured to count different types of cache fills of the one or more dedicated caches. The processing system can further include a memory and a fabric interconnecting the plurality of processing clusters and the memory. The plurality of counters may be configured to count different types of cache fills, including at least one counter configured to count total cache fills and at least one counter configured to count off-cluster cache fills. Off-cluster cache fills can include at least one of cross-cluster cache fills and cache fills from the memory. The plurality of counters can include at least one counter configured to count cross-cluster cache fills.

The processing system can further include one or more controllers configured to control performance of one or more of the clusters, the processor cores, the fabric, and the memory responsive to cache fill metrics derived from the plurality of counters. The one or more controllers may be implemented in an operating system running on the processing system. The one or more controllers may be configured to determine a cache fill count for a core, responsive to a determination that the cache fill count is high determine whether the cache fills are predominantly cross-cluster cache fills, and responsive to a determination that the cache fills are predominantly cross-cluster cache fills, increase performance of a source cluster of the cross-cluster cache fills and the fabric.

The one or more controllers may be further configured to increase performance of the source cluster by analyzing cache fill metrics derived from the one or more counters, determining whether a grouping of threads executing on the processing system is correct, and determining whether thread groups executing on the processing system may be reassigned to different clusters. Responsive to a determination that the thread grouping is incorrect, the controller may be configured to reassign one or more threads to a different thread group. The controller may be further configured to reassign one or more thread groups to a different cluster. Responsive to a determination that the thread groups executing on the processing system may be reassigned to different clusters, the controller may be configured to reassign one or more thread groups to a different cluster. Responsive to determinations that the thread grouping is correct and the thread groups executing on the processing system may not be reassigned to different clusters, the controller may be configured to increase an operating frequency of the source cluster.

In some embodiments, the one or more controllers may be configured to perform the described performance control further in response to one or more energy consumption metrics. The energy consumption metrics can include an energy per instruction or an energy dissipation metric. Additionally, these energy metrics may be for a given core or other element of the processing system, or may be an aggregated metric for multiple components of the processing system.

A method of controlling a processing system can include detecting a high energy consumption metric, determining a cache fill count for a core of the processing system, determining whether the cache fill count is high, determining whether the cache fills are predominantly cross-cluster cache fills, and responsive to determinations that the cache fill count is high and the fills are predominantly cross-cluster cache fills, increasing performance of a source cluster of the cross-cluster cache fills and a fabric connecting the core and the source cluster. Increasing performance of the source cluster can include analyzing cache fill metrics derived from one or more cache fill counters associated with the core, determining whether a grouping of threads executing on the processing system is correct, and determining whether thread groups executing on the processing system may be reassigned to different cores or clusters. The high energy consumption metric can include an estimate of energy dissipation per instruction or an estimate of energy dissipation by one or more components of the processing system.

The method can further include, responsive to a determination that the thread grouping is incorrect, reassigning one or more threads to a different thread group. The method can further include reassigning one or more thread groups to a different cluster. The method can further include, responsive to a determination that the thread groups executing on the processing system may be reassigned to different clusters, reassigning one or more thread groups to a different cluster. The method can further include, responsive to determinations that the thread grouping is correct and the thread groups executing on the processing system may not be reassigned to different clusters, increasing an operating frequency of the source cluster. Increasing an operating frequency of the source cluster can include increasing the operating frequency of the source cluster with reference to a performance state map relating performance states of the core and the source cluster.

A controller for controlling a performance state of one or more cores of a multi-core, multi-cluster processing system, can include logic configured to determine a coherent fill ratio of a first core of the processing system, logic configured to compare the coherent fill ratio to a coherent fill ratio threshold and logic configured to increase performance of a second core of the processing system responsive to a coherent fill ratio exceeding the coherent fill ratio threshold and energy per instruction exceeding the high energy per instruction threshold. Additionally or alternatively, the controller can include logic to determine energy per instruction and/or energy dissipation for the core, as well as logic configured to compare these energy metrics to one or more predetermined thresholds. The logic configured to increase performance of a second core of the processing system may then be further configured to increase performance of the second core responsive to the coherent fill ratio as discussed above as well as in response to the energy per instruction and/or energy dissipation metrics. The logic configured to increase performance of the second core of the processing system may be configured to increase performance of the second core according to a performance map mapping one or more performance states of the second core to one or more performance state of the first core. The performance map may be stored in a memory of the processing system. The performance map may be updated dynamically.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
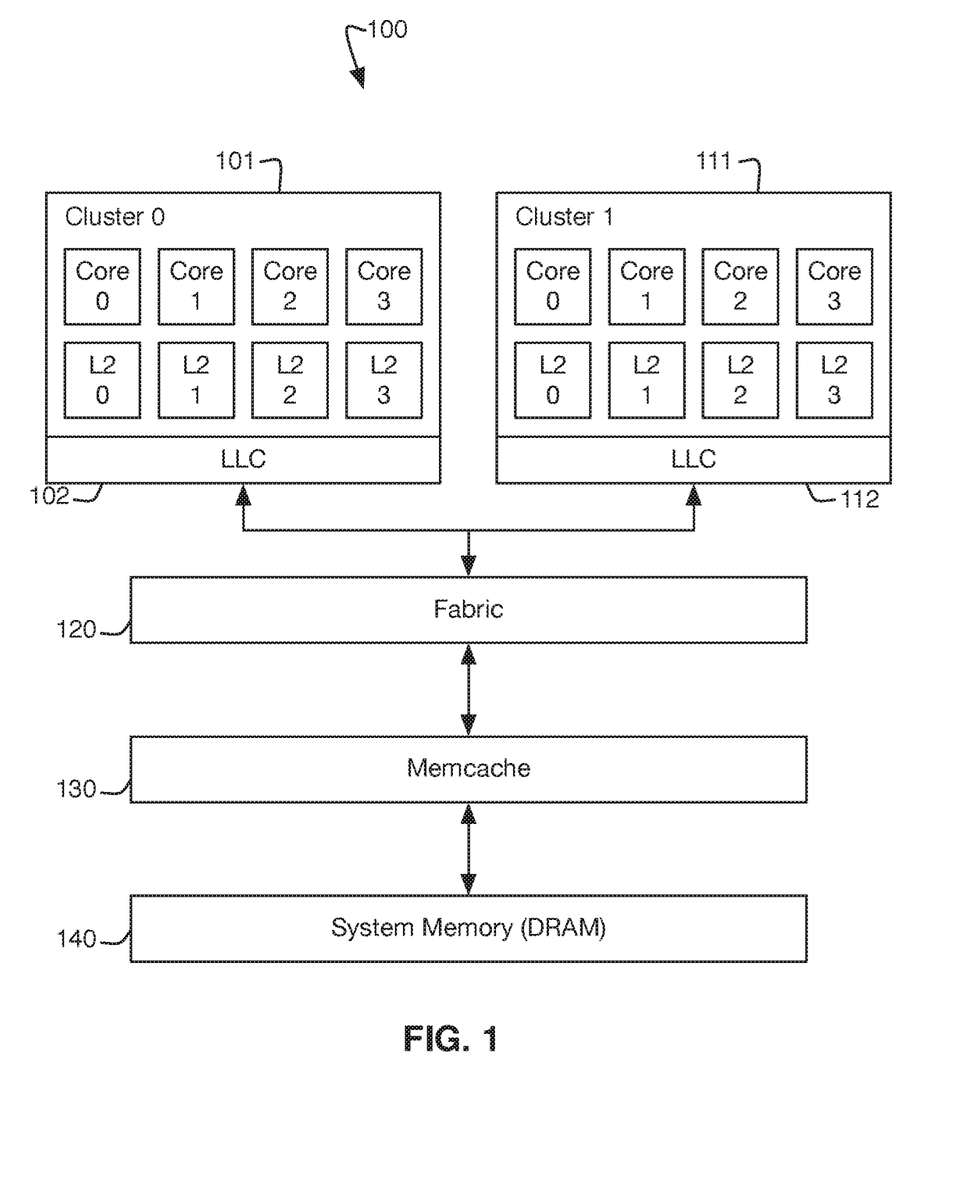
FIG. 1 illustrates a partial high level block diagram of a processing system.

FIG. 1 illustrates a partial high level block diagram of a processing system 100. The processing system includes a first processor cluster 101 (also referred to as Cluster 0) and a second processor cluster 111 (also referred to as Cluster 1). Each processor cluster may include a plurality of processing cores. In the illustrated embodiment, each cluster includes four processing cores (a/k/a "cores"), which are identified as Cores 0-3. However, each cluster may include differing numbers of cores, and there may also be other numbers of clusters. The foregoing description assumes that the cores of each cluster are central processing unit ("CPU") cores. However, the teachings herein may also be applicable to clusters of other processing core types, such as graphics processing unit (GPU) cores, neural engine cores (which may be optimized for neural network based computation), or other types of general purpose or specialized processing cores.

In some embodiments, the clusters may all include cores of the same type. In other embodiments, the respective clusters may each include cores of different types. For example, cluster 101 may include a plurality of high performance cores. High performance cores may be optimized to execute a high number of instructions per unit time. Such performance cores may, however, be prone to relatively higher energy dissipation. Cluster 111 may include a plurality of high efficiency cores. High efficiency cores may be optimized to execute a high number of instructions per joule of energy dissipated. Such efficiency cores may, however, be prone to relatively lower performance in terms of time required to perform various computational tasks. Modern processing systems may therefore employ one or more clusters of "performance cores" and one or more clusters of "efficiency cores" (and optionally one or more clusters of other core types), so that the various computing tasks performed by the system may be allocated among the cores in a way that provides a suitable level of performance at a suitable level of energy dissipation. Suitability may vary from one embodiment to the next, but may generally be a function of desired user experience with respect to responsiveness and completion time versus energy dissipation, which may be particularly important in the context of battery-powered devices. This allocation may be performed by a combination of the on chip instrumentation and controllers of the processing device as well as various operating system level functionality such as schedulers and performance controllers.

With continued reference to FIG. 1, the respective processor cores may be configured to retrieve data and instructions from execution from a variety of locations. For example, each processor core may include an L1 cache (not shown). This L1 cache can include a small but very fast memory that is in close proximity to the processing core and is dedicated to that processing core. This L1 cache can be used to store data and instructions that are expected to be needed by the processor. Because the L1 cache is in close proximity to the processor, these data and instructions may be retrieved much more quickly than were they retrieved from one of the other sources described below. However, because L1 cache may be relatively expensive, both in terms of cost to produce and die area occupied, additional cache layers may be included.

Thus, each processor core may also have a corresponding L2 cache. As illustrated in FIG. 1, the L2 caches are identified with a number identifying the corresponding processing core. Thus, for each cluster, Core 0 has L2 cache L2 0; Core 1 has L2 cache L2 1, and so on. In some embodiments, the L2 cache may be a larger, but slower memory than the L1 cache. However, the L2 cache may still be smaller but much faster than the system memory (or other sources of data). Thus, in the event that data or instructions needed by a processing core are not present in that cores L1 cache, the processing core may be able to retrieve such data and/or instructions from the L2 cache more quickly than it could from main memory (or another source).

In some embodiments, each cluster may have another layer of cache. For example, Cluster 0 (101) may include last level cache ("LLC") 102. Similarly, Cluster 1 (111) may include last level cache ("LLC") 112. These LLCs may be memories that are larger but slower than the respective L2 caches discussed above, but which may still be smaller, faster, and more proximate the respective cores than the system memory. In some embodiments, these LLCs may be shared by all cores of the respective clusters. If data or instructions needed by a particular core on a particular cluster are not found in that core's L1 or L2 caches, they may be found in the corresponding cluster's LLC. Thus, there may still be a performance advantage relative to having to retrieve such data from main memory.

In addition to the conventional caching benefits described above, the LLCs may also serve as a basis for inter-core communication. For example, because each cluster has a common LLC for all cores of that cluster, if a thread executing on a first core of a cluster needs data or instructions from a related thread executing on a second core of the cluster, those data or instructions may be found in the LLC cache. The LLC cache may thus serve as a mechanism for data exchange between cores of a given cluster. Moreover, in the multi-cluster embodiment illustrated in FIG. 1, if a thread executing on a core of Cluster 0 (101) needs data from a related thread executing on a core of Cluster 1 (111), such data may be exchanged between the cores by way of the respective clusters' LLCs 102 and 112 via fabric 120. Fabric 120 may be any suitable interconnection between clusters. In some embodiments, Cluster 0 (101) and Cluster 1 (111) may be located on a common semiconductor die, and fabric 120 may also be located on that same die. Such construction may be employed in a variety of modern processor and system on a chip (SoC) architectures.

Also connected to fabric 120 may be memory cache 130. This may serve as yet another layer of cache. In some embodiments memory cache 130 may be a memory that is larger and slower than the respective LLCs 102 and 112, but still smaller and faster than system memory, e.g., DRAM 140. In other embodiments, system memory 140 may be directly connected to fabric 120. Memory cache 130 may be integrated into the same chip/SoC as the computing clusters and fabric 120, or may be a separate semiconductor die. Such separate semiconductor die may be included in the same package as the processor/SoC, or could be separately packaged. It may be expected that system memory 140 would be a separate semiconductor die from the processor SoC and would also be separately packaged. However, in some embodiments, common packaging could be employed.

In general, the exact disposition of the various elements of FIG. 1 with respect to semiconductor dies and packaging is not pertinent to the concepts discussed herein. Instead, the foregoing description is provided as context for better understanding of the following concepts. Additionally, the general description and operation of cache layers (L1, L2, LLC, memory cache) has been provided as an illustrative, but non-limiting context for understanding the performance telemetry and control concepts described herein.

Figure 2:
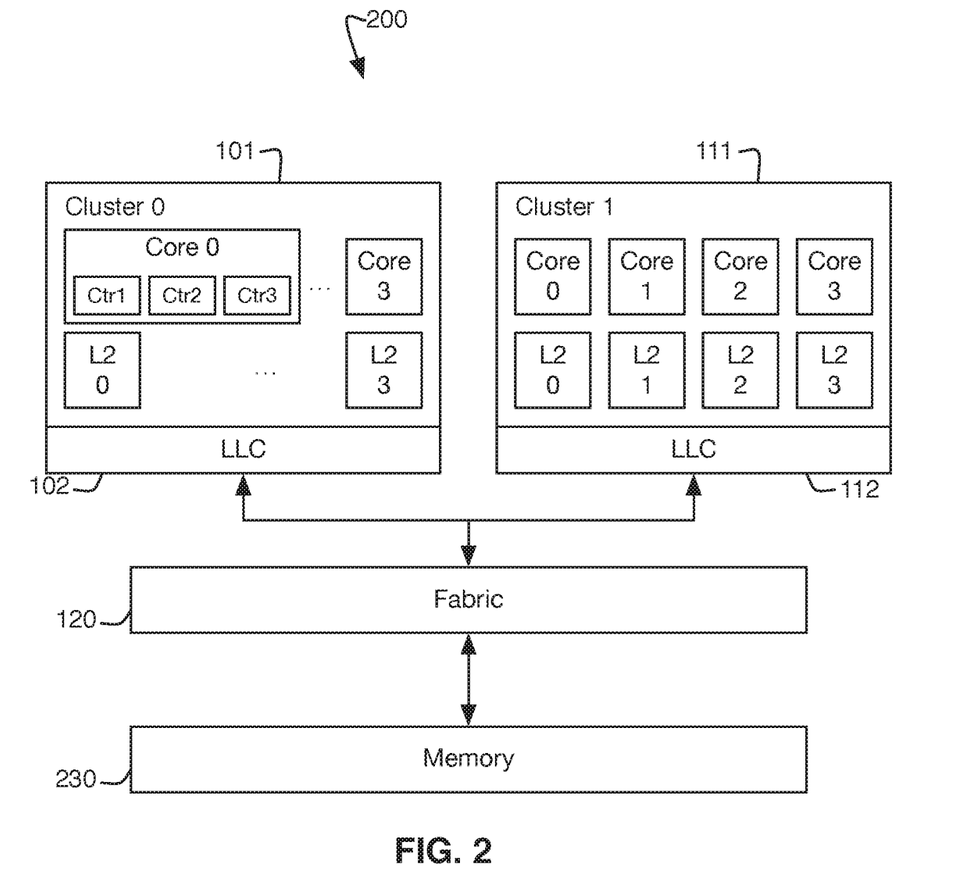
FIG. 2 illustrates a partial high level block diagram processing system.

FIG. 2 illustrates a computing system 200 substantially similar to that described above with respect to FIG. 1. In FIG. 2, system memory 140 and memory cache 130 have been replaced by generic memory 230. It will be appreciated that memory 230 may represent a variety of memory and memory cache configurations, but for purposes of the following description all memory accesses off the respective clusters 101 and 111 may be considered as accessing generic memory 230. Cores 1 and 2 of Cluster 0, along with their corresponding L2 caches L2 1 and L2 2 have been omitted from FIG. 2 for clarity and brevity, but it is to be understood that they remain present. Additionally, like processing system 100, other numbers of clusters and cores per cluster may also be used in conjunction with concepts described below.

In Cluster 0 101, Core 0 has been expanded to show three counters Ctr1, Ctr2, and Ctr3 that may be used to provide telemetry that may advantageously be used for control of processing system 200. More specifically, these counters may provide counts of various types of cache fills that may be used to adjust the performance of various components of processing system 200 as described in greater detail below. In some embodiments there may be more or fewer counters per core, and it is to be understood that each processing core of each cluster may include such counters.

As described above, the various caches available to each processor core can provide different levels of performance, with the lower level/closer caches providing much faster retrieval than the higher level/farther caches. When a core is executing a thread, depending on where the next data or instructions needed by the core come from, the core may be forced to wait on the data or instructions. In general, data or instructions retrieved from the L1 or L2 cache of a core may be retrieved sufficiently quickly that there is little time that the core is "stalled," i.e., waiting on data. However, for data that must come from other caches, such as the LLCs, particularly for data that is not already present in the core's LLC, the processor may spend a significant amount of time stalled. This may be undesirable for at least two reasons. While the processor is stalled, it may remain in a relatively high power state, i.e., it may have its dynamic voltage and frequency set to relatively higher values that result in increased energy dissipation. Additionally, while the processor is stalled, the computing workload is not making forward progress, and thus the system or user may be waiting on results. This combination of high energy dissipation and low computing throughput provide a "worst of both worlds" scenario that is preferably avoided where possible.

Processing system 200 may employ one or more counters that keep track of the number of cache fills. A cache fill is an instance in which data is transferred into a cache from another source. In general, caches retain recently used data, as the nature of many computing processes is such that recently used data is likely to be needed again in the near future. However, if a processing core requires data or instructions that are not in the cache, the data must be retrieved from another source (whether a higher level cache, system memory 230, or another cluster). When these data or instructions are retrieved, they may be stored in the respective lower cache levels as a cache fill.

A certain number of cache fills are to be expected. Otherwise the processor core would continually be operating on the same data. Nonetheless, a high number of cache fills may be an indicator that the core's performance is being adversely affected by some condition that may be remedied by changing the way in which the cores, clusters, and overall processing system are operating. The counters Ctr1, Ctr2, and Ctr3 may be used to infer such conditions, which may then be mitigated by the performance controller features integrated into processing system 200 and/or the operating system of the processing system.

In a multi-cluster system like that illustrated in FIGS. 1-2, there is a difference between cache fills that come from the local cluster (e.g., Core 0 of Cluster 0 has a cache fill from its L2 cache L2 0 or data that was already stored in LLC 102) versus cache fills that come from the other cluster (Cluster 1, 111) or system memory 230. For example, the latter two cache fill types (cross-cluster or from system memory) may take significantly longer than the first type (local cache fills). Thus, in some embodiments it may be desirable to configure a first counter of a core (e.g., counter Ctr1 of Core 0) to count all cache fills. (In other embodiments, the first counter may be configured to count just local cache fills, i.e., those cache fills that come from Core 0's L2 cache L2 0 or directly from LLC 102.) A second counter of the core (e.g., counter Ctr2 of Core 0) may be configured to count cross-cluster cache fills, i.e., those that come from Cluster 1, 111. In some embodiments, this second counter may be configured to also count fills that come from memory 230. In any case, the two counters may be used to either directly determine or infer: (1) a total number of cache fills, (2) a number of "local" cache fills, and (3) a number of "off-cluster" cache fills. In still other embodiments, second counter Ctr2 may be configured to count cross-cluster fills and a third counter Ctr3 may be configured to count fills coming from memory 230. In this case, it may be easier to distinguish between cache fills coming from another cluster versus those coming from system memory.

Thus, each processor core of each cluster may include at least a first counter that counts either total L1 cache fills or L1 cache fills that are local to the cluster. Each core may also include a second counter that counts L1 cache fills that are remote from the cluster (whether cross-cluster or from system memory). These two counters may be combined (by addition or subtraction, as appropriate) to determine total cache fills, local cache fills, and off-cluster cache fills. In still further embodiments, each core of each cluster may include a third counter that counts L1 cache fills from system memory, while the second counter counts only cross-cluster fills. The various counts accumulated by these counters may then be used to control processing system 200 in ways that improve both computing throughput and power efficiency of the processing system.

Before discussing ways in which the cache fill counts may be used to improve performance of processing system 200, it is useful to briefly discuss performance control of the various components of processing system 200. In general, the performance of a digital processing device may be increased by increasing the frequency at which the device operates. In many cases, it may be necessary and/or appropriate to increase the operating voltage along with the frequency. (The following description will refer specifically to only frequency, but it is to be understood that such references may also include appropriate voltage increases.)

As a result of the increased frequency, the amount of data that the various components can process in a given time will increase. However, energy dissipation is directly related to the frequency, and thus also increases with performance. To account for this, modern processing systems rely on various controllers to provide an appropriate level of processing capability while reducing energy dissipation to the extent appropriate. A variety of different structures and techniques for such control exist, but in general they may be thought of as a one or more closed loop controllers (CLPC a/k/a "closed loop performance controllers") that take various inputs and provide outputs that determine, among other things, a dynamic voltage and frequency management (DVFM) control signal that sets the performance of the various components.

For example, in processing system 200, Cluster 0 and Cluster 1 may be operated at a frequency determined by a controller. In fact, individual cores of the respective clusters may each have their own controller, and thus their own distinct operating frequency. Similarly, interconnect fabric 120 may be operated at a different frequency, with memory 230 operated yet another different frequency. Each component that may be operated at a different frequency to achieve a desired level of throughput and energy dissipation may be thought of as a frequency domain. In general, when higher computing performance is desired, the frequency of that component must be increased. Additionally, to the extent performance of that component depends on input or output through another component, it may be necessary or desirable to increase the frequency of that component as well. Thus, a controller may need to increase not just the frequency of a given component, but also components in any other related frequency domains.

Figure 3:
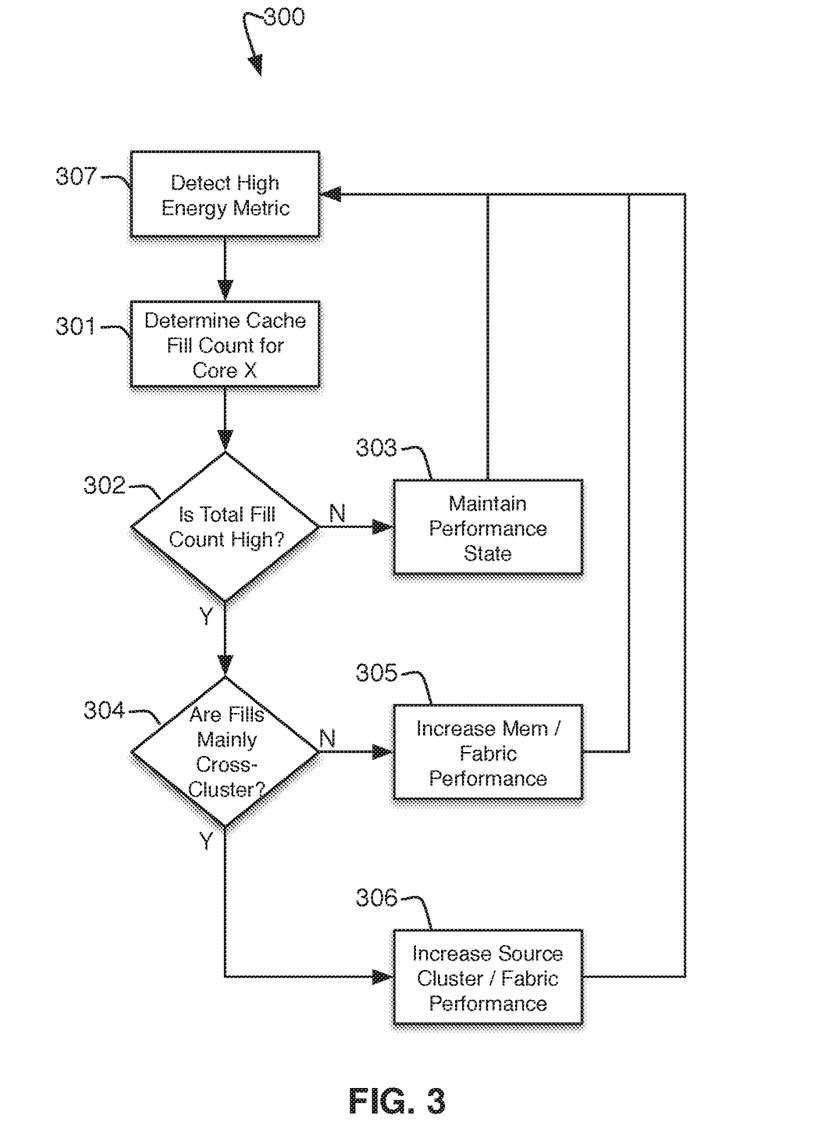
FIG. 3 illustrates a flow chart depicting a method for adjusting the performance of one or more components of a processing system responsive to an analysis of cache fills.

FIG. 3 illustrates a flow chart 300 that depicts a method for adjusting the performance of one or more components of processing system 200 responsive to energy consumption and an analysis of cache fills. In block 307, the controller may detect a high energy metric. This high energy metric may be either a high total energy dissipation or a high energy per instruction. The energy metric may be an energy on a per core basis, i.e., the energy consumed by the core the controller is controlling. Alternatively, the energy metric may be an aggregated energy metric for multiple components of the processing system. If a high energy metric is detected, the algorithm may continue as described below. If a high energy metric is not detected, then performance of the algorithm may be delayed until such time as a high energy metric is detected.

In block 301, the controller may determine a cache fill count for a given core. In cases where one of the counters referenced above is counting total cache fills, the cache fill count may be read directly from the counter. In cases where one counter is counting local cache fills and one or more other counters are counting off-cluster fills (either cross-cluster, from system memory, or both), this may be determined by adding the respective counters. In either case, in block 302, it may be determined whether the total fill count is high. For example, the fill count may be compared to a threshold. A fill count exceeding the threshold may be considered a high fill count.

It will be appreciated that time may also be considered as part of this process. For example, if the technique depicted by flow chart 300 is performed at fixed time intervals, a fixed total cache fill count threshold may be used to determine whether the fill count is high. Alternatively, the technique of flow chart 300 may be performed at non-fixed times, e.g., when a core switches between threads or the core otherwise context swaps. In this case, an amount of time that the thread was executing may be used as part of the determination in block 302 whether the total fill count is high. For example, a number of cache fills per time of execution may be compared to a threshold, with a total number of cache fills per unit time exceeding the threshold being considered a "high" total cache fill count.

If the total cache fill count is not high, then the performance state of the various processing components may be maintained in their performance state (block 303). In other words, if there is not an excessive number of total cache fills, then the performance of the various components of processing system 200 may be considered to be adequate and no adjustment of performance state is necessary. On the other hand, if the total cache fill count is high, then it may be determined whether the cache fills are mainly cross-cluster fills (block 304). This may be determined with reference to the plurality of counters referenced above.

For example, in the case in which a first counter Ctr1 is configured to count total cache fills, and a second counter Ctr2 is configured to count local cache fills, then the difference between these two counters may be used to compute a number of off-cluster fills. In the case of just these two counters, the number of off-cluster cache fills that are also cross-cluster fills may not be directly determined. However, the number of cross-cluster fills may nonetheless be inferred based on other mechanisms, such as a heuristic model that accounts for a number of cross-cluster cache fills versus either the total number of fills or the number of off-cluster fills. As another example, a first counter Ctr1 may be configured to count total cache fills, and the second counter Ctr2 may be configured to count cross-cluster fills. In this case, block 304 may compare the number of cross-cluster fills (directly read from counter Ctr2) to a threshold or may compare the ratio of cross-cluster fills to total cache fills to an alternative threshold. Other variations based on the number of counters available to identify cache fills of various types and their specific configuration are possible.

In any case, if it is determined in block 304 that the cache fills are not cross-cluster fills, then it may be inferred that the cache fills are primarily coming from system memory 230. Thus, in block 305, the performance of memory 230 and fabric 120 may be increased. This performance increase may reduce the time associated with the excessive number of cache fills from memory 230. Alternatively, if it is determined in block 304 that the cache fills are mainly cross-cluster fills, then, in block 306, the performance of the source cluster and fabric 120 may be increased. This performance increase may reduce the time associated with the excessive number of cache fills from the source cluster. As described in greater detail below, the performance increase of the source cluster may be achieved by reallocating threads among the various cores/clusters so as to reduce the number of cross-cluster cache fills required. Additionally or alternatively, the performance increase of the source cluster may be achieved by leaving the thread allocation as is and increasing the performance state (e.g., operating frequency) of the source cluster.

Figure 4:
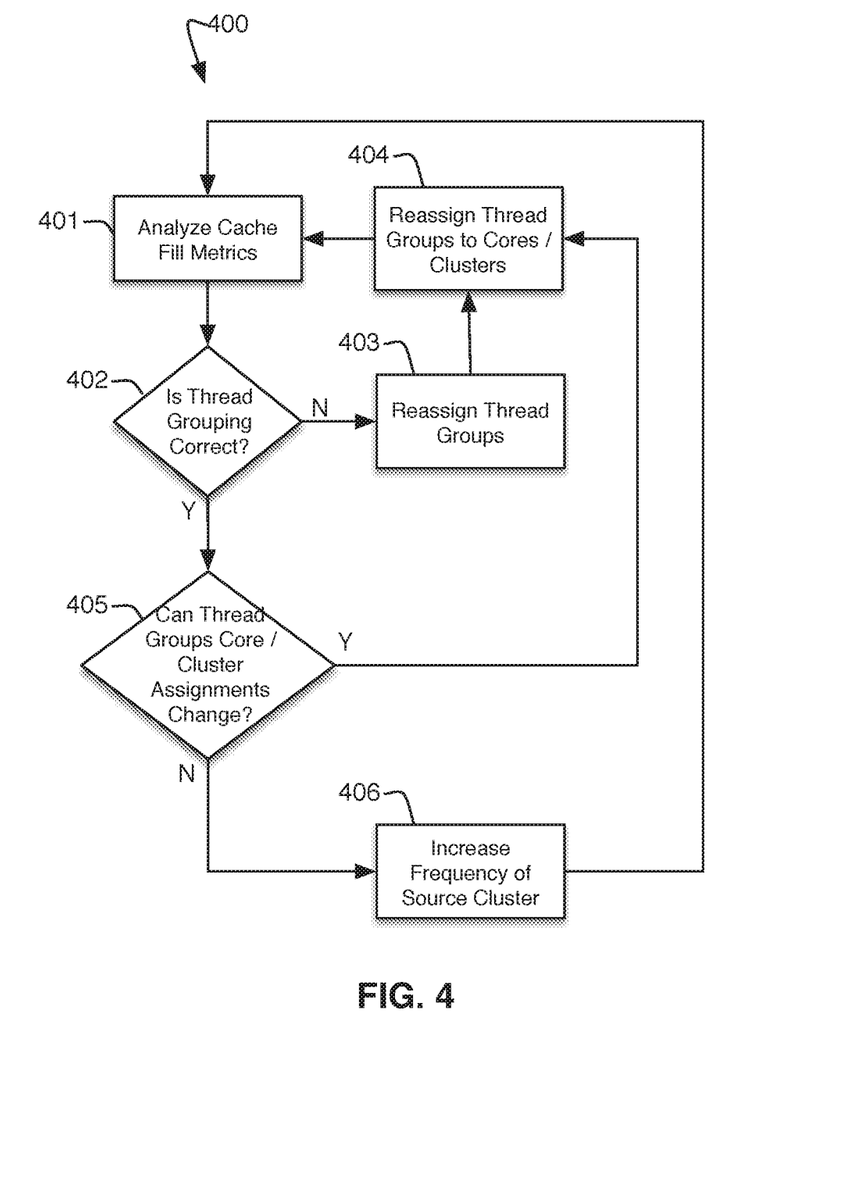
FIG. 4 illustrates a flow chart 400 of a process for increasing performance of a source cluster.

FIG. 4 illustrates a flow chart 400 of a process for increasing performance of a source cluster as mentioned above. The process can include analyzing the cache fill metrics (block 401). This may include a variety of analyses and comparisons of cache fill metrics derived from the cache fill counters described above. As mentioned, cache fill counters may be configured to measure various combinations of: total cache fills, local cache fills, off-cluster cache fills, cross-cluster cache fills, system memory cache fills, as well as other data, depending on the specific implementation provided. In some instances, the various combinations of cache fills may be calculated or inferred from counts of other types of cache fills based on direct arithmetic, heuristic models, or other techniques. These cache fill measurements may be used as or otherwise adapted or combined into a plurality of cache fill metrics. Analysis of these cache fill metrics can be used to determine, in block 402 whether the thread grouping is correct.

As an aside, in multi-threaded computing systems, a process may have a plurality of threads that make up that process. Each processing core may execute a single thread at a time, although some processing cores may employ a form of simultaneous thread execution, sometimes known as hyperthreading, in which two threads may simultaneously execute on the core. Regardless, a higher level process, comprising a plurality of threads, may have those threads grouped into a thread group by a controller/scheduler of processing system 200. As noted above, the controller/scheduler may be made up of one or more modules including hardware in the processing system as well as operating system software. The controller/scheduler may assign the threads of the thread groups to one or more cores depending on a wide variety of considerations that are beyond the scope of the present disclosure.

Although the details of thread to thread group assignment and thread to core/cluster assignment are beyond the scope of this disclosure, in general, the following considerations may be used for such thread grouping and core/cluster assignment. (1) Threads belonging to the same higher level process may be put into the same thread group. (2) Threads belonging to a process that should be completed quickly (e.g., user-interactive process) may be assigned to higher performance cores/clusters. (3) Threads belonging to a process that need not be completed in short order (e.g., background processes) may be assigned to lower performance (or efficiency) cores/clusters. (4) Threads belonging to the same thread group may be assigned to the same cluster (to reduce the amount of cross-cluster communication). Numerous other considerations may also be used in a given embodiment, although the foregoing are most relevant to the discussion herein.

From the analysis of cache fill metrics performed in block 401, it may be determined whether the thread grouping is correct or appropriate (block 402). As noted above, the processor scheduler/controller determines thread groups using a variety of factors. However, in some cases the initial thread group assignments may be incorrect, inappropriate, or at least sub-optimal. This could be caused by a variety of factors. For example, there may be two higher level processes that are related in such a way that the output of one is used as the input of the other. In such cases, it may be advantageous to assign the threads of both processes, or at least the interrelated threads of both processes to the same thread group. However, scheduler/controller may not be aware of this relationship at the time of initial thread group assignment.

If it happens that two interrelated threads (such as those in the given example) wind up executing on cores of different clusters, a high number of cross-cluster fills may result. This high number of cross-cluster fills may be determined by the analysis of cache fill metrics performed in block 401 and may lead to a determination in block 402 that the thread grouping is incorrect. If so, the threads may be reassigned to new thread groups to put the interrelated threads in the same thread group (block 403).

If threads are reassigned to thread groups (block 403), the reassigned thread groups may also be reassigned to clusters of the processing unit. A full consideration of thread group to core/cluster assignment is beyond the scope of this disclosure, but, in general, the scheduler/controller may assign thread groups to cores/clusters using principles similar to those discussed above with respect to thread group assignment. More specifically, it may be advantageous to assign thread groups to a common cluster, with individual threads of the thread group being assigned to various cores of the common cluster. If there are thread groups that are known to have interrelated threads, such as a thread of a first thread group's output being used as an input to a second thread of a second thread group, then both thread groups may be assigned to the same cluster.

Depending on the number of threads in a thread group, it may be that a cluster lacks a sufficient number of processor cores to accommodate all threads. In such cases, the scheduler/controller may decide that it is advantageous to assign some threads of a thread group to one cluster, while other threads of that same thread group may be assigned to a different cluster. In some embodiments, assignment of threads to a different cluster for load-shedding purposes, sometimes known as "spilling," may be influenced by the inter-cluster fill metrics. For example, when the schedule controller knows that it is spilling threads to a different cluster, it can measure or detect that this spilling coincides with substantial data sharing between clusters. Responsive to that measurement or detection, the scheduler/controller may modify its policy to reduce or cease thread spilling, thereby reducing the need for inter-cluster fills. Additionally, there may be some processes that include threads for which higher priority execution is desired, while that same process includes threads for which lower priority execution is acceptable. In such cases, the higher priority of threads of the thread group may be assigned to one or more performance clusters/cores, while the lower priority threads of that thread group may be assigned to one or more efficiency clusters/cores. These and numerous other considerations may be considered by the scheduler/controller in assigning threads and thread groups to cores and clusters of cores.

Returning to block 404 of FIG. 4, the analysis of cache fill metrics in block 401 may lead to a determination in block 402 that the thread grouping was not correct/appropriate. In other words, a more correct/appropriate/optimal thread grouping may exist. This determination may lead to a reassignment of thread groups in block 403. This reassignment of thread groups may be followed by a reassignment of thread groups to clusters using the considerations discussed above (or other appropriate considerations).

Alternatively, if in block 402 it is determined that the thread grouping is correct (based on the analysis of cache fill metrics in block 401), a determination may be made whether the thread groups may be reassigned to clusters in such a way as to reduce the number of cross-cluster cache fills. If so, then the thread groups may be reassigned to cores/clusters in block 404 as discussed above. This may happen in a situation in which the thread groups are correctly assigned, but the thread groups (or individual threads thereof) may be reassigned to cores/clusters in such a way as to minimize the need for cross-cluster communication. On the other hand, if it is not possible (or practical) to reassign thread groups to different cores/clusters, then it may be appropriate to increase the performance of the source cluster (i.e., the cluster that is the source of cache fills on which another cluster is waiting) (block 406). In such case, it may also be appropriate to increase the performance state (e.g., operating state) of the interconnecting fabric as well, for the reasons discussed above.

Figure 5:
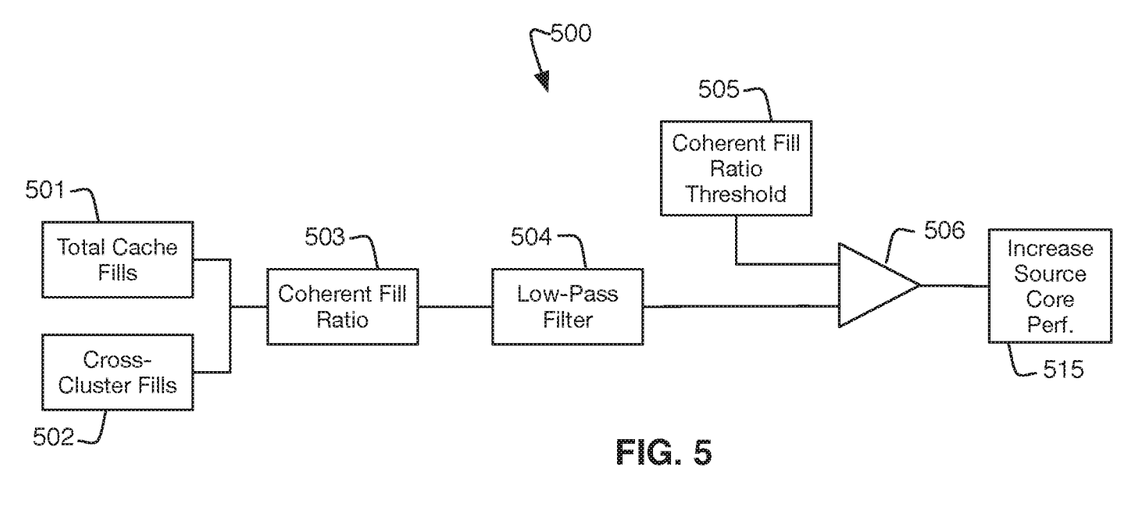
FIG. 5 illustrates a partial block diagram of a performance controller incorporating control techniques based on cache fill metrics.

FIG. 5 illustrates a partial block diagram of a performance controller 500 incorporating control techniques based on cache fill metrics. Controller 500 may be used in conjunction with a multi-cluster processing system, for example, that illustrated in FIG. 2. Such a controller may be particularly advantageous when one cluster (e.g., Cluster 0 101) is an efficiency-optimized cluster ("efficiency cluster" or "E-cluster") and another cluster (e.g., Cluster 1 110) is a performance-optimized cluster ("performance cluster" or "P-cluster") as described above. In some embodiments, controller 500 may be implemented by an operating system running on processing system 200. It will be understood that there will be a number of other controller inputs and outputs in a practical controller implementation, although such additional inputs and outputs have been omitted here for clarity.

Block 501 represents a first counter, e.g., Ctr1, that keeps track of total cache fills for a given core of a given cluster. For example, block 501 may represent a total number of cache fills for a performance core (Core 0) on a performance cluster (Cluster 1/111). Block 502 may represent a second counter, e.g., Ctr2, that keeps track of cross-cluster cache fills for the same core. The controller may look at these two metrics to determine a coherent fill ratio (block 503). This coherent fill ratio may optionally be passed through a low pass filter 504, so that the control loop does not respond unduly rapidly or aggressively to a brief transient situation of a high number of cross-cluster cache fills.

Either the coherent fill ratio (block 503) or the low-pass filtered coherent fill ratio (504) may then be compared to a coherent fill ratio threshold (505), e.g., by comparator block 506. Comparator block 506 has been drawn using symbology for a physical comparator circuit, but it should be understood that the comparison may be performed in software by the processor control loop of the operating system. If the ratio of cross-cluster fills becomes too high (as indicated by the comparator), a signal is provided to block 515 to increase the performance of the source core.

Figure 6:
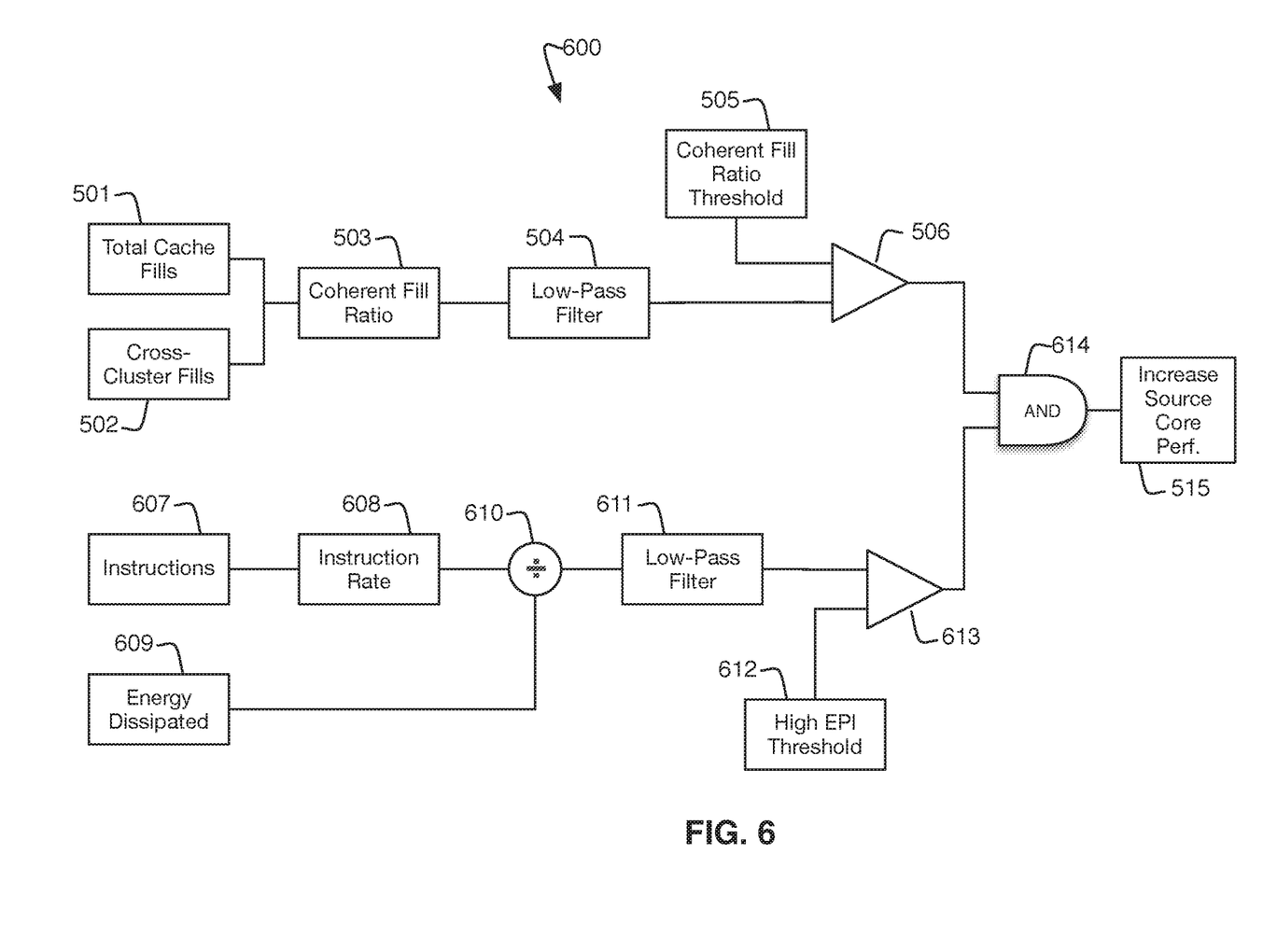
FIG. 6 illustrates a partial block diagram of a performance controller incorporating control techniques based on cache fill metrics and energy per instruction.
Figure 7:
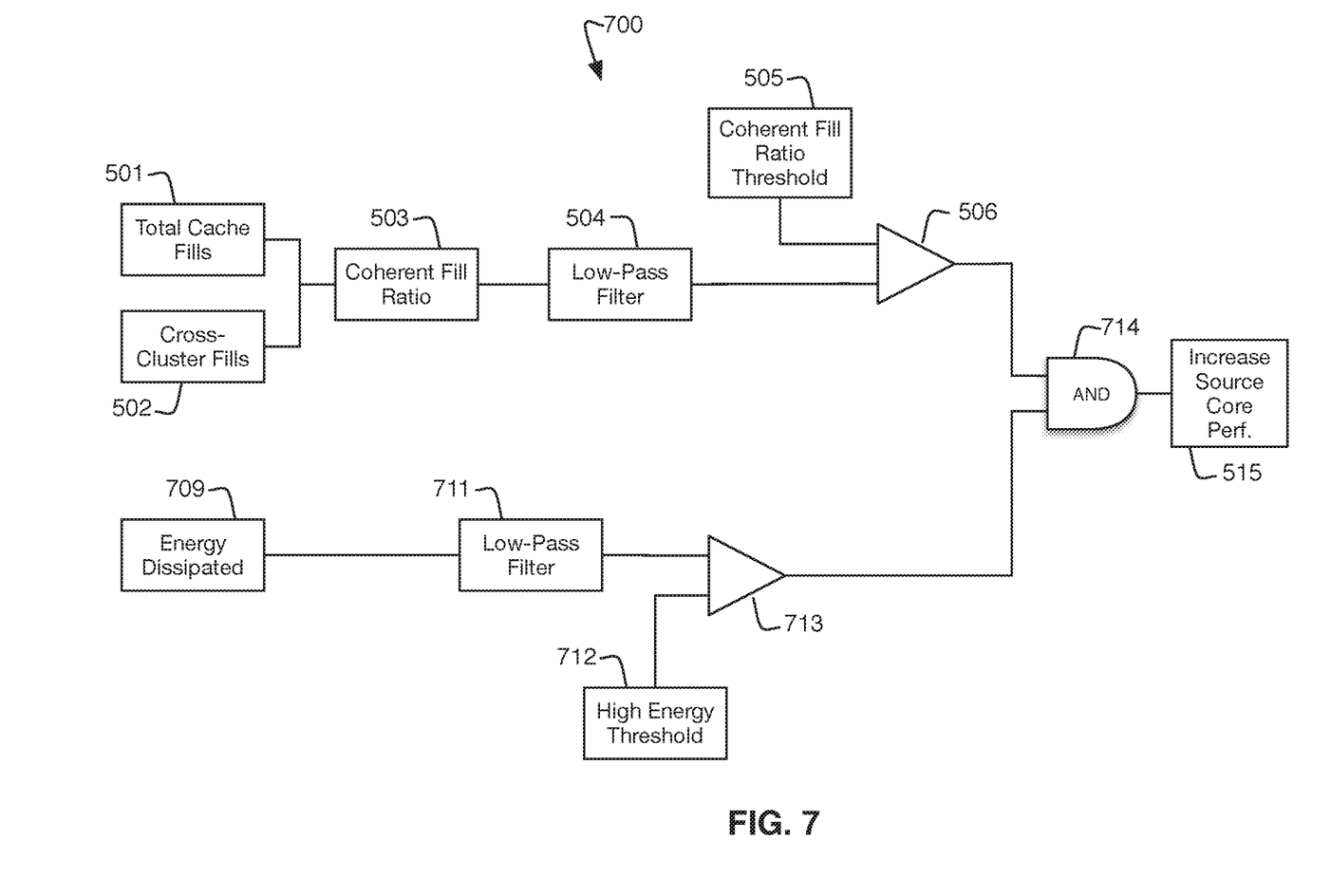
FIG. 7 illustrates a partial block diagram of a performance controller incorporating control techniques based on cache fill metrics and energy dissipation.
Figure 8:
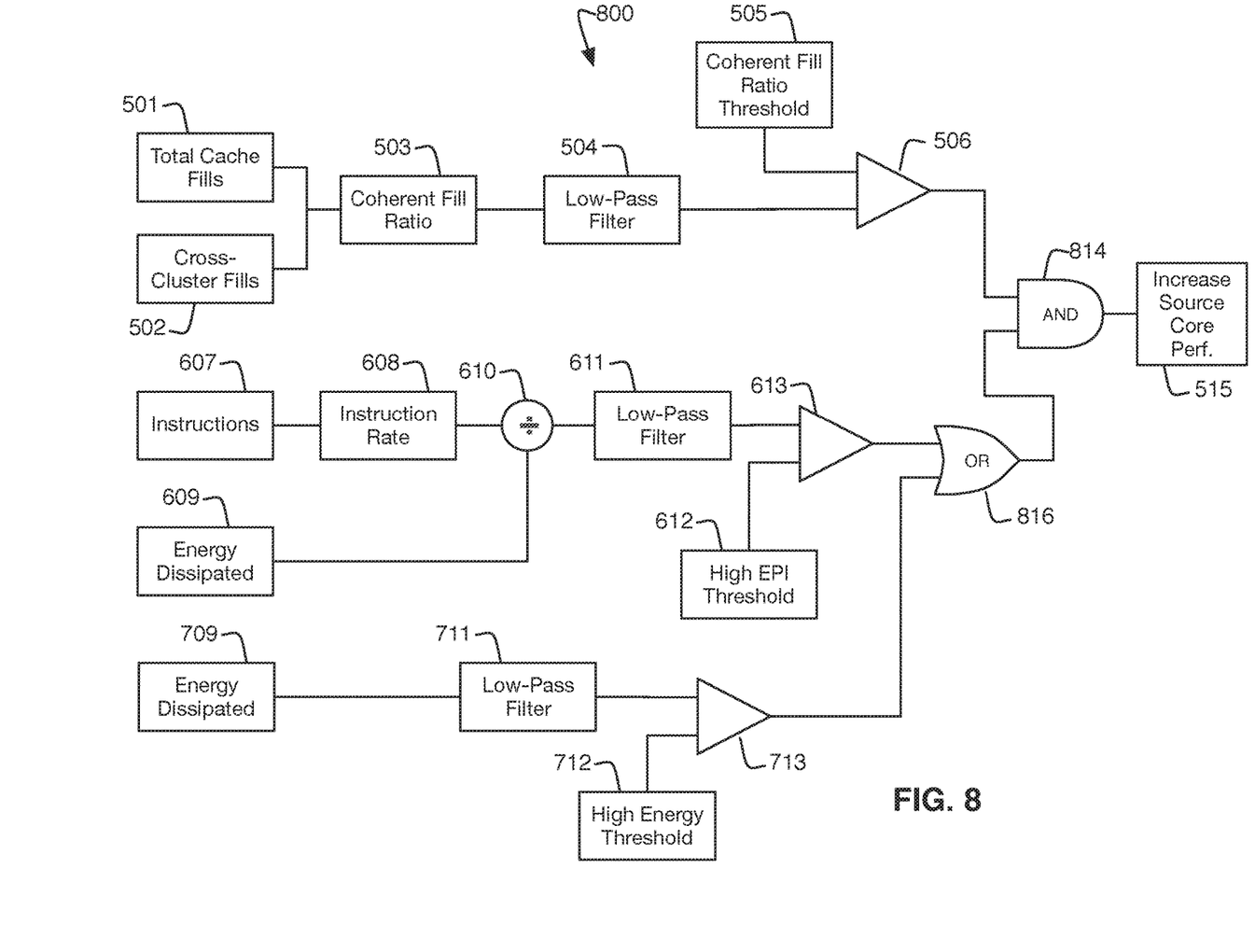
FIG. 8 illustrates a partial block diagram of a performance controller incorporating control techniques based on cache fill metrics, energy per instruction, and energy dissipation.

Alternatively, in addition to cache fill metrics, a performance controller may use energy metrics and cache fill metrics to control the performance of a processing unit. FIG. 6 illustrates a partial block diagram of a performance controller 600 that uses energy per instruction ("EPI") in addition to cache fill metrics. FIG. 7 illustrates a partial block diagram of a performance controller 700 that uses total energy dissipation in addition to cache fill metrics. FIG. 8 illustrates a partial block diagram of a performance controller 800 that uses both energy per instruction and total energy dissipation in addition to cache fill metrics.

Turning now to FIG. 6, a partial block diagram of performance controller 600 is illustrated. The upper portion of the block diagram illustrates cache fill control components as described above with reference to FIG. 5. However, rather than provide an output directly to block 515, which increases performance of the source core, the cache fill control blocks provide their input to AND operator 614, described in greater detail below. Additional inputs into controller 500 include an instruction counter 607 and energy dissipation indicator 609. Instruction counter 607 may be an additional component of the processing system's instrumentation that keeps running count of a number of instructions executed by the core of interest. Thus, there may be a similar counter for each core of each cluster. A value of this counter at the time a thread is submitted to a core may be subtracted from the value of this counter at the time the thread completes execution, either because it has completed the task or is otherwise context-switched out because of other considerations, to determine a number of instructions processed by the core for that thread. This number of instructions, combined with the time of execution for the thread, also derived from processing system telemetry, may be used to derive an instruction rate (block 608).

The instruction rate may be divided (block 610) into the energy dissipated (609) over the same interval to determine an energy per instruction, which may be a measure of the power efficiency of computation being performed by the processing system. Energy dissipated (block 609) may be derived from any of a variety of power measurement mechanisms built into processing system 200. Many modern processor systems include one or more digital power estimators. For example, each cluster and/or each core may include its own power estimator. In some embodiments, digital power estimators may be implemented as a free-running, ever-increasing counter that continuously increments as the processing element is running. When the processing element is running in a higher performance state, the counter may be updated with a greater increment and/or more frequently. When the processing element is running in a lower performance state, the counter may be updated with a smaller increment and/or less frequently. As a result, subtracting a digital power estimator sample from the beginning of a work instance from a digital power estimator sample from the end of a work instance gives an indication of the energy consumed by that processing element in completing the work instance. Dividing the energy consumed by the length of time between beginning and end of the work instance give an estimate of the power dissipation (i.e., energy dissipation per unit time) of the processing element. In any case, once the energy per instruction ("EPI") is determined by division block 610, the EPI value may optionally be passed through low-pass filter 611. As described above with respect to low pass filter 504, this operation may be used to prevent the controller from responding unduly quickly or aggressively to a short term transient increase (or decrease) in energy dissipation.

Either the raw EPI value or the low pass filtered EPI value may be compared to a high EPI threshold (612) by comparison operator 613. As with comparison operator 506, comparison operator 613 has been drawn as a physical comparator circuit, but it should be understood that the comparison may be performed in software by the processor control loop of the operating system. If the comparison of the energy per instruction (either direct or low-pass filtered) to the threshold indicates that the EPI has exceeded the threshold, meaning the system is dissipating large amounts of energy per instruction, a logic high input may be provided to a second input of AND operator 614.

As discussed above, a first input of AND operator 614 is an indication that a large number of fills for the core controlled by controller are coming from a core on another cluster. (Alternatively, in the case of a cluster LLC that is inclusive of the higher-level caches in the individual cores, the fill source could be the LLC itself) A second input of AND operator 514 is an indication that the core controlled by the controller is in a high energy dissipation state. AND operator 514 is drawn as a hardware logic gate, but it is to be understood that this logical function may be implemented in software, e.g., the processing control loop implemented by an operating system running on the processing system. If both of these conditions are true, the output of AND operator 514 may become a logic high, triggering an increase in performance of the core that is the source of the cross-cluster fills (block 515).

Turning now to FIG. 7, a partial block diagram of performance controller 700 that uses total energy dissipation in addition to cache fill metrics to control source core performance is illustrated. The upper portion of the block diagram illustrates cache fill control components as described above with reference to FIGS. 5 and 6. Like controller 600 of FIG. 6, controller 700's cache fill control blocks provide their input to AND operator 714, described in greater detail below. Energy dissipation indicator 609 is provided as an additional input into controller 700. As above, Energy dissipated (block 609) may be derived from any of a variety of power measurement mechanisms built into processing system 200. The energy dissipation value may optionally be passed through low-pass filter 711. As described above with respect to low pass filters 504 and 611, this operation may be used to prevent the controller from responding unduly quickly or aggressively to a short term transient increase (or decrease) in energy dissipation.

Either the raw energy dissipation value or the low pass filtered energy dissipation value may be compared to a high energy dissipation threshold (712) by comparison operator 713. As with comparison operators 506 and 613 discussed above, comparison operator 713 has been drawn as a physical comparator circuit, but it should be understood that the comparison may be performed in software by the processor control loop of the operating system. If the comparison of the energy dissipated (either direct or low-pass filtered) to the threshold indicates that the energy dissipated has exceeded the threshold, meaning the system is dissipating large amounts of energy, a logic high input may be provided to a second input of AND operator 714.

As discussed above, a first input of AND operator 714 is an indication that a large number of fills for the core controlled by controller are coming from a core on another cluster. (Alternatively, in the case of a cluster LLC that is inclusive of the higher-level caches in the individual cores, the fill source could be the LLC itself) A second input of AND operator 714 is an indication that the core controlled by the controller is in a high energy dissipation state. AND operator 714 is drawn as a hardware logic gate, but it is to be understood that this logical function may be implemented in software, e.g., the processing control loop implemented by an operating system running on the processing system. If both of these conditions are true, the output of AND operator 714 may become a logic high, triggering an increase in performance of the core that is the source of the cross-cluster fills (block 515).

Turning now to FIG. 8, a partial block diagram of performance controller 800 that uses total energy dissipation and energy per instruction ("EPI") in addition to cache fill metrics to control source core performance is illustrated. The upper portion of the block diagram illustrates cache fill control components as described above with reference to FIGS. 5,6, and 7. Like the controllers discussed above, controller 800's cache fill control blocks provide their input to AND operator 814, described in greater detail below. Controller 800 also incorporates energy per instruction control blocks 607-613 as described above with reference to FIG. 6. These energy per instruction control blocks provide their output to OR operator 816, discussed in greater detail below. Finally, controller 800 also incorporates total energy dissipated blocks 709-713 as described above with reference to FIG. 7. These total energy dissipated control blocks also provide their output to OR operator 816.

OR operator 816 receives a logical true signal on its first input when the energy per instruction for a core exceeds the high EPI threshold. OR operator 816 receives a logical true signal on its second input when the total energy dissipated for a core exceeds a high energy threshold. If either of OR operator 816's inputs is true, it asserts a logical true signal at its output, which is provided to AND operator 814. Like AND operators 614 and 714 discussed above, AND operator 814 receives a logical true signal at its first input if the coherent fill ratio exceeds a predetermined threshold. Thus, if the number of cross-cluster cache fills causes the coherent fill ratio to be exceeded, and the processing unit is in either a high EPI state or a high total energy dissipation state, then the performance of the source core may be increased (block 515).

In any of the foregoing embodiments, increasing performance of the core that is the source of the cross-cluster fills, as in block 515, may take the form of having the source core transition to the same performance state as the destination core (in the case of cores of the same type) or a performance state corresponding to the performance state of the destination core (in the case of cores of different types). For example, in some embodiments of the processing system, higher performance states of an efficiency core may be more performant than lower performance states of a power core. However, even the highest performance states of an E-core may not be as performant as moderate to high performance states of a P-core. It may therefore be desirable in some cases to have one or more tables mapping performance states of a P-core to corresponding performance states of an E-core. Thus, when it a P-core requests a performance increase of the E-core, a corresponding performance state (derived from the one or more tables) may be set so that the P-core is not waiting on the E-core any more than necessary.

These performance state maps may be stored in memory so as to be accessible to the operating system's performance controllers as needed. As a practical matter, such tables may result in the E-cores being set to their highest performance states for all but relatively low performance states of the P-cores. Additionally, these performance maps may be derived from empirical data based on a variety of workloads. Different performance maps may be used for different types of workloads, and/or the performance maps may be dynamic and change in response to different workloads or other conditions.

Described above are various features and embodiments relating to control of multi-cluster, multi-core processing systems using cache fill metrics. Such control techniques may be used in a variety of applications but may be particularly advantageous when used in conjunction with portable electronic devices for which optimizing tradeoffs between computational performance and power efficiency are significant considerations.

Although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A processing system comprising:
a plurality of processing clusters, each cluster comprising a plurality of processor cores and a last level cache, wherein each processor core has one or more dedicated caches and a plurality of counters, the plurality of counters being configured to count different types of cache fills of the one or more dedicated caches;
a memory;
a fabric interconnecting the plurality of processing clusters and the memory; and
one or more controllers configured to control performance of one or more of the clusters, the processor cores, the fabric, and the memory responsive to one or more cache fill metrics derived from the plurality of counters;
wherein the plurality of counters configured to count different types of cache fills includes at least one counter configured to count total cache fills and at least one counter configured to count off-cluster cache fills.

2. The processing system of claim 1 wherein the off-cluster cache fills include at least one of cross-cluster cache fills and cache fills from the memory.

3. The processing system of claim 1 wherein the plurality of counters includes at least one counter configured to count cross-cluster cache fills.

4. The processing system of claim 1 wherein the one or more controllers are further configured to control performance of the one or more clusters responsive to the one or more cache fill metrics and one or more energy consumption metrics including an estimate of energy dissipation per instruction.

5. The processing system of claim 1 wherein the one or more controllers are further configured to control performance of the one or more clusters responsive to the one or more cache fill metrics and one or more energy consumption metrics including an estimate of energy dissipation by the one or more components of the processing system.

6. The processing system of claim 1 wherein the one or more controllers are implemented in an operating system running on the processing system.

7. The processing system of claim 1 wherein the one or more controllers are configured to:
determine a cache fill count for a core;
responsive to a determination that the cache fill count is high determine whether cache fills corresponding to the cache fill count are predominantly cross-cluster cache fills; and
responsive to a determination that the cache fills corresponding to the cache fill count are predominantly cross-cluster cache fills, increase performance of a source cluster of the cross-cluster cache fills and the fabric.

8. The processing system of claim 7 wherein the one or more controllers are further configured to increase performance of the source cluster by:
analyzing cache fill metrics derived from the one or more counters;
determining whether a grouping of threads executing on the processing system is correct; and
determining whether thread groups executing on the processing system may be reassigned to different clusters.

9. The processing system of claim 8 wherein, responsive to a determination that the thread grouping is incorrect, the controller is configured to reassign one or more threads to a different thread group.

10. The processing system of claim 9 wherein the controller is further configured to reassign one or more thread groups to a different cluster.

11. The processing system of claim 8 wherein, responsive to a determination that the thread groups executing on the processing system may be reassigned to different clusters, the controller is configured to reassign one or more thread groups to a different cluster.

12. The processing system of claim 8 wherein, responsive to determinations that the thread grouping is correct and the thread groups executing on the processing system may not be reassigned to different clusters, the controller is configured to increase an operating frequency of the source cluster.

13. A method of controlling a processing system, the method comprising:
 detecting a high energy consumption metric;
 determining a cache fill count for a core of the processing system;
 determining whether the cache fill count is high;
 determining whether cache fills corresponding to the cache fill count are predominantly cross-cluster cache fills; and
 responsive to the detection of the high energy consumption metric and determinations that the cache count is high and the cache fills corresponding to the cache fill count are predominantly cross-cluster cache fills, increasing performance of a source cluster of the cross-cluster cache fills and a fabric connecting the core and the source cluster.

14. The method of claim 13 wherein the high energy consumption metric includes an estimate of energy dissipation per instruction.

15. The method of claim 13 wherein the high energy consumption metric includes an estimate of energy dissipation by one or more components of the processing system.

16. The method of claim 13 wherein increasing performance of the source cluster comprises:
 analyzing cache fill metrics derived from one or more cache fill counters associated with the core;
 determining whether a grouping of threads executing on the processing system is correct; and
 determining whether thread groups executing on the processing system may be reassigned to different cores or clusters.

17. The method of claim 16 further comprising, responsive to a determination that the thread grouping is incorrect, reassigning one or more threads to a different thread group.

18. The method of claim 17 further comprising reassigning one or more thread groups to a different cluster.

19. The method of claim 16 further comprising, responsive to a determination that the thread groups executing on the processing system may be reassigned to different clusters, reassigning one or more thread groups to a different cluster.

20. The method of claim 16 further comprising, responsive to determinations that the thread grouping is correct and the thread groups executing on the processing system may not be reassigned to different clusters, increasing an operating frequency of the source cluster.

21. The method of claim 20 wherein increasing an operating frequency of the source cluster comprises increasing the operating frequency of the source cluster with reference to a performance state map relating performance states of the core and the source cluster.

22. A controller for controlling a performance state of one or more cores of a multi-core, multi-cluster processing system, the controller comprising:
 a non-transitory computer readable medium storing logic configured to cause the controller to determine a coherent fill ratio of a first core of the processing system, the coherent fill ratio being a ratio of cross-cluster cache fills to a total number of cache fills;
 a non-transitory computer readable medium storing logic configured to cause the controller to compare the coherent fill ratio to a corresponding threshold; and
 a non-transitory computer readable medium storing logic configured to cause the controller to increase performance of a second core of the processing system responsive to a coherent fill ratio exceeding the corresponding threshold.

23. The controller of claim 22 further comprising:
 a non-transitory computer readable medium storing logic configured to cause the controller to determine an energy per instruction measure of the first core; and
 a non-transitory computer readable medium storing logic configured to cause the controller to compare the energy per instruction measure to a corresponding threshold;
 wherein the logic configured to cause the controller to increase performance of the second core of the processing system is configured to cause the controller to increase performance of the second core of the processing system responsive to a coherent fill ratio exceeding the corresponding threshold and the energy per instruction measure exceeding the corresponding threshold.

24. The controller of claim 23 further comprising:
 a non-transitory computer readable medium storing logic configured to cause the controller to determine an energy dissipation measure of the first core; and
 a non-transitory computer readable medium storing logic configured to cause the controller to compare the energy dissipation measure of the first core to a corresponding threshold;
 wherein the logic configured to cause the controller to increase performance of the second core of the processing system is configured to cause the controller to increase performance of the second core of the processing system responsive to the coherent fill ratio exceeding the corresponding threshold and at least one of the energy per instruction measure exceeding the corresponding threshold or the determined energy dissipation measure exceeding the corresponding threshold.

25. The controller of claim 22 further comprising:
 a non-transitory computer readable medium storing logic configured to cause the controller to determine an energy dissipation measure of the first core; and
 a non-transitory computer readable medium storing logic configured to cause the controller to compare the energy dissipation measure to a corresponding threshold;
 wherein the logic configured to cause the controller to increase performance of a second core of the processing system is configured to cause the controller to increase performance of the second core of the processing system responsive to the coherent fill ratio exceeding the corresponding threshold and the determined energy dissipation measure exceeding the corresponding threshold.

26. The controller of claim 22 wherein the logic configured to cause the controller to increase performance of the second core of the processing system is further configured to cause the controller to increase performance of the second core according to a performance map mapping one or more performance states of the second core to one or more performance state of the first core.

27. The controller of claim 26 wherein the performance map is stored in a memory of the processing system.

28. The controller of claim 26 wherein the performance map is updated dynamically.

29. A processing system comprising:
a plurality of processing clusters, each cluster comprising a plurality of processor cores and a last level cache, wherein each processor core has one or more dedicated caches and a plurality of counters, the plurality of counters being configured to count different types of cache fills of the one or more dedicated caches;
a memory;
a fabric interconnecting the plurality of processing clusters and the memory; and
one or more controllers configured to control performance of one or more of the clusters, the processor cores, the fabric, and the memory responsive to one or more cache fill metrics derived from the plurality of counters;
wherein the one or more controllers are further configured to control performance of the one or more clusters responsive to the one or more cache fill metrics and one or more energy consumption metrics including an estimate of energy dissipation per instruction.

30. The processing system of claim 29 wherein the plurality of counters configured to count different types of cache fills includes at least one counter configured to count total cache fills and at least one counter configured to count off-cluster cache fills.

31. The processing system of claim 30 wherein the off-cluster cache fills include at least one of cross-cluster cache fills and cache fills from the memory.

32. The processing system of claim 30 wherein the plurality of counters includes at least one counter configured to count cross-cluster cache fills.

33. The processing system of claim 29 wherein the one or more controllers are further configured to control performance of the one or more clusters responsive to the one or more cache fill metrics and one or more energy consumption metrics including an estimate of energy dissipation by one or more components of the processing system.

34. The processing system of claim 29 wherein the one or more controllers are implemented in an operating system running on the processing system.

35. The processing system of claim 29 wherein the one or more controllers are configured to:
determine a cache fill count for a core;
responsive to a determination that the cache fill count is high determine whether cache fills corresponding to the cache fill count are predominantly cross-cluster cache fills; and
responsive to a determination that the cache fills corresponding to the cache fill count are predominantly cross-cluster cache fills, increase performance of a source cluster of the cross-cluster cache fills and the fabric.

36. The processing system of claim 35 wherein the one or more controllers are further configured to increase performance of the source cluster by:
analyzing cache fill metrics derived from the one or more counters;
determining whether a grouping of threads executing on the processing system is correct; and
determining whether thread groups executing on the processing system may be reassigned to different clusters.

37. The processing system of claim 36 wherein, responsive to a determination that the thread grouping is incorrect, the controller is configured to reassign one or more threads to a different thread group.

38. The processing system of claim 37 wherein the controller is further configured to reassign one or more thread groups to a different cluster.

39. The processing system of claim 36 wherein, responsive to a determination that the thread groups executing on the processing system may be reassigned to different clusters, the controller is configured to reassign one or more thread groups to a different cluster.

40. The processing system of claim 36 wherein, responsive to determinations that the thread grouping is correct and the thread groups executing on the processing system may not be reassigned to different clusters, the controller is configured to increase an operating frequency of the source cluster.

* * * * *

UNITED STATES PATENT AND TRADEMARK OFFICE
CERTIFICATE OF CORRECTION

PATENT NO. : 10,942,850 B2
APPLICATION NO. : 16/513225
DATED : March 9, 2021
INVENTOR(S) : John G. Dorsey et al.

Page 1 of 1

It is certified that error appears in the above-identified patent and that said Letters Patent is hereby corrected as shown below:

In the Claims

Claim 5, at Column 16, Line 35, delete "the" after -- by --

Claim 24, at Column 18, Line 39, replace "the" before "coherent" with -- a --

Claim 25, at Column 18, Line 57, replace "the" before "coherent" with -- a --

Signed and Sealed this
Twentieth Day of April, 2021

Drew Hirshfeld
*Performing the Functions and Duties of the
Under Secretary of Commerce for Intellectual Property and
Director of the United States Patent and Trademark Office*